United States Patent [19]

Norman et al.

[11] Patent Number: 6,073,027
[45] Date of Patent: Jun. 6, 2000

[54] PORTABLE RADIOTELEPHONE WITH SLIDING COVER AND AUTOMATIC ANTENNA EXTENSION

[75] Inventors: Daniel P. Norman, E. Jacksonville, Fla.; Gregory Clyde Griffith, Atlanta; Charles Martin Link, II, Roswell, both of Ga.

[73] Assignee: Bellsouth Corporation, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,426

[22] Filed: Aug. 29, 1996

[51] Int. Cl.⁷ ........................................ H04B 1/38
[52] U.S. Cl. .......................... 455/550; 455/90; 455/557; 379/428; 379/433; 379/440
[58] Field of Search .................. 455/550, 90, 73, 455/557; D14/137, 138, 140, 150, 151; 379/440, 441, 434, 428, 433

[56] References Cited

U.S. PATENT DOCUMENTS

| | | |
|---|---|---|
| D. 381,020 | 7/1997 | Harden et al. .......................... D14/138 |
| 4,845,772 | 7/1989 | Metroka et al. ............................ 379/61 |
| 4,945,570 | 7/1990 | Gerson et al. ............................ 381/110 |
| 5,148,471 | 9/1992 | Metroka et al. ............................ 379/58 |
| 5,151,946 | 9/1992 | Martensson ................................ 379/38 |
| 5,175,759 | 12/1992 | Metroka et al. ........................... 379/58 |
| 5,223,780 | 6/1993 | Hu ............................................. 320/14 |
| 5,278,993 | 1/1994 | Reiff et al. ................................. 455/90 |
| 5,321,738 | 6/1994 | Ha ............................................. 379/61 |
| 5,327,584 | 7/1994 | Adachi et al. .............................. 455/89 |
| 5,369,788 | 11/1994 | Nagai ......................................... 455/90 |
| 5,450,619 | 9/1995 | Maeda ........................................ 455/89 |

(List continued on next page.)

FOREIGN PATENT DOCUMENTS

| | | |
|---|---|---|
| 0 414 365 A2 | 2/1991 | European Pat. Off. . |
| 0 536 578 A2 | 4/1993 | European Pat. Off. . |
| 3323858A1 | 7/1983 | Germany . |
| 3836406 A1 | 5/1990 | Germany . |
| 4307164 A1 | 9/1994 | Germany . |
| 2235850 | 8/1989 | United Kingdom ................... 379/433 |
| 2235606 | 3/1991 | United Kingdom ............ H04M 1/03 |
| WO 92/09163 | 5/1992 | WIPO . |

OTHER PUBLICATIONS

Official Gazette; Jan. 24, 1995, Pat. No. 5,384,825; Method For Memory Dialing For Cellular Telephones, filed on Jul. 1, 1993; Ser. No. 86,413.

Official Gazette; Sep. 21, 1993; Pat. No. 5,247,565; Cellular Telephone with Keypad Controller, filed on Oct. 21, 1991; Ser. No. 779,787.

Primary Examiner—Dwayne D. Bost
Assistant Examiner—Quochien Vuong
Attorney, Agent, or Firm—Jones & Askew, LLP

[57] ABSTRACT

According to one aspect, a portable radiotelephone comprising a housing a cover slidably engaged with the housing and selectively reciprocable relative to the housing between a first position, wherein the portable radiotelephone is in an on-hook condition and, alternatively, a second position, wherein the portable radiotelephone is in an off-hook condition. According to another aspect, the portable radiotelephone comprises a housing, a cover slidably engaged with the housing and selectively reciprocable relative to the housing between a first position and, alternatively, a second position, wherein at least a portion of the cover extends outwardly beyond the housing, and an antenna fixed to and extending along the cover, at least a portion of the antenna extending outwardly beyond the housing when the cover is in the second position. The portable radiotelephone alleviates inadvertent key depression and inadvertent phone call disconnect upon answering and more easily enables maximum cellular telephone performance during phone calls.

8 Claims, 5 Drawing Sheets

U.S. PATENT DOCUMENTS

| | | | |
|---|---|---|---|
| 5,463,687 | 10/1995 | Takizawa | 379/433 |
| 5,485,517 | 1/1996 | Gray | 379/433 |
| 5,493,690 | 2/1996 | Shimazaki | 379/63 |
| 5,497,506 | 3/1996 | Takeyasu | 455/89 |
| 5,542,106 | 7/1996 | Krenz et al. | 455/90 |
| 5,564,078 | 10/1996 | Nagai | 455/89 |
| 5,574,772 | 11/1996 | Scalisi et al. | 379/58 |
| 5,603,100 | 2/1997 | Yasuda | 455/89 |
| 5,630,211 | 5/1997 | Nagai | 455/89 |
| 5,635,943 | 6/1997 | Grunwell | 343/702 |
| 5,649,306 | 7/1997 | Vannatta et al. | 455/575 |
| 5,661,641 | 8/1997 | Shindo | 361/814 |

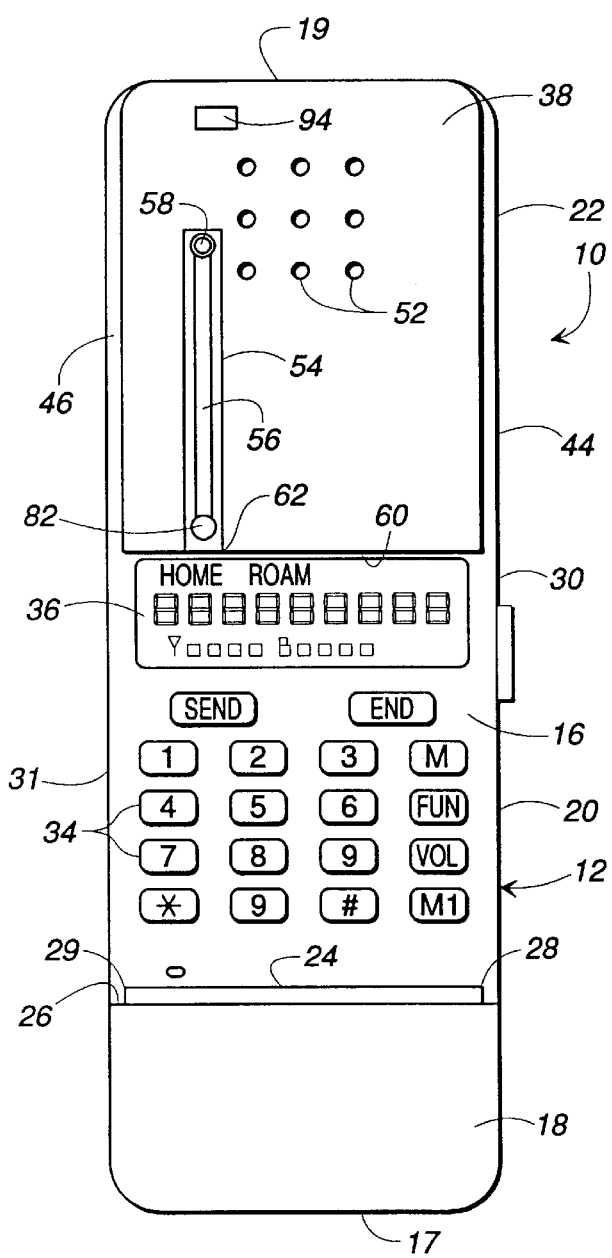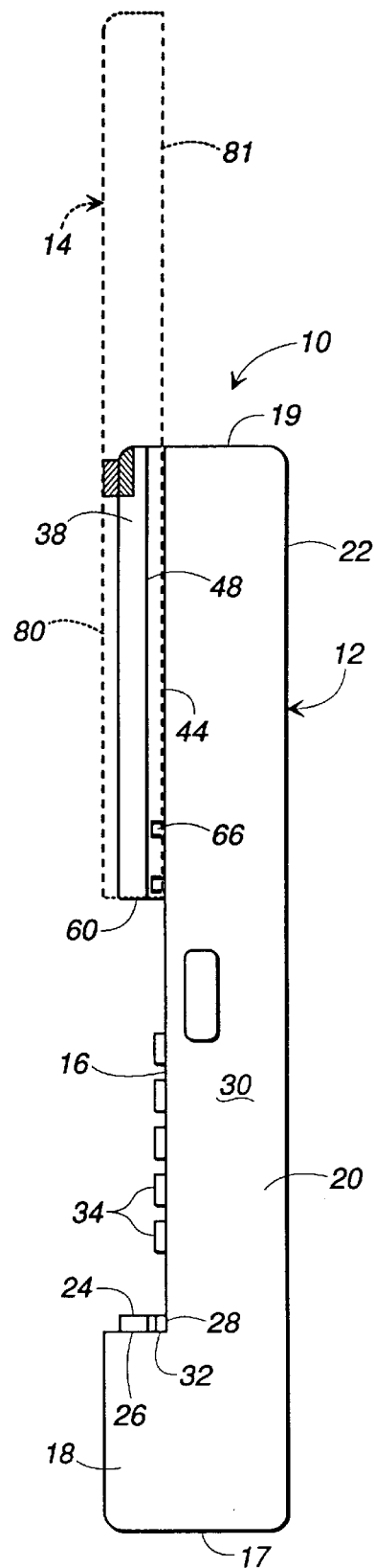
FIG. 3  FIG. 4

6,073,027

PORTABLE RADIOTELEPHONE WITH SLIDING COVER AND AUTOMATIC ANTENNA EXTENSION

TECHNICAL FIELD

This invention generally relates to portable radiotelephones, and more particularly to a cellular portable radiotelephone having a user interface cover and a hidden antenna.

BACKGROUND OF THE INVENTION

Portable radiotelephones are well known and commonly used, particularly in the form of portable cellular telephones. Cellular telephones can now be made in very small sizes to fit into pockets and purses. For these smaller telephones, the conventional fixed mast antenna has been replaced with a hidden or retractable antenna. Fixed mast antennas are effective because they are always in the fully extended position for maximum performance of the telephone, but the added length to the overall telephone can defeat the small size of the telephone body. Although the small cellular telephones with the hidden or retractable antenna are convenient, one must remember to extend the antenna when answering or sending a phone call to take advantage of the best possible performance of the telephone. A collapsed antenna can support minimal radio frequency propagation to receive incoming phone calls regardless of antenna position; however, users often do not extend the antenna and conduct phone conversations with the antenna in the retracted position. With the antenna in the retracted position, the sound quality of the telephone is often poor and the effective range of the telephone is reduced.

Another problem with conventional cellular telephones is inadvertent key depression which can cause the cellular telephone to power-up and drain the battery or can automatically initiate a phone call and cause the user to inadvertently run up a telephone bill. Cellular telephones often have covers to prevent inadvertent key depression, but inadvertent key depression can still occur if an object becomes lodged between the cover and the keypad as can happen with rotatable "flip" covers. With flip covers, phone calls can also be inadvertently disconnected while trying to answer the call when the flip cover is inadvertently opened and closed.

Accordingly, there is a need for a portable radiotelephone which more easily enables maximum telephone performance during telephone calls and which prevents inadvertent key depression and inadvertent phone call disconnection.

SUMMARY OF THE INVENTION

This invention solves the above-described problems in the prior art by providing a portable radiotelephone comprising a housing and a cover slidably engaged with the housing and selectively reciprocable relative to the housing between a first position, wherein the portable radio telephone is in an on-hook condition and, alternatively, a second position, wherein the portable radiotelephone is in an off-hook position. To answer a telephone call or to make a telephone call with the portable radiotelephone of this invention, the cover must be shifted from the first position, wherein the portable radiotelephone is in the on-hook condition, to the second position, wherein the portable radiotelephone is in the off-hook condition. When the telephone is shifted from the second position back to the first position, the telephone call is automatically disconnected.

More particularly, the radiotelephone of the present invention includes a device for selectively holding the cover at the first position and, alternatively, releasing the cover, and a device for automatically moving the cover from the first position to the second position in response to the releasing device releasing the cover. Because the cover of the telephone is held in place while the telephone is in the on-hook condition, inadvertent key depression is prevented. In addition, because the cover is automatically extended to the second position from the first position when released, inadvertent telephone call disconnection when attempting to answer the telephone is prevented.

According to another aspect of the present invention, a portable radiotelephone is provided comprising a housing, a cover slidably engaged with the housing and selectively reciprocable relative to the housing between a first position and, alternatively, a second position, wherein at least a portion of the cover extends outwardly beyond the housing, and an antenna fixed to and extending along the cover, at least a portion of the antenna extending outwardly beyond the housing when the cover is in the second position. To answer a phone call using the portable radiotelephone of the present invention, one must extend the antenna and thus, the calls cannot be conducted with the antenna in the collapsed or retracted position.

Therefore, an object of the present invention is to provide a portable radiotelephone which prevents inadvertent key depression and inadvertent phone call disconnection during answering of the telephone.

Another object of the present invention is to provide a portable radiotelephone which more easily enables maximum telephone performance while conducting phone calls.

Other objects, features, and advantages of the present invention will become apparent from the following detailed description, drawings, and claims.

BRIEF DESCRIPTION OF DRAWINGS

In FIG. 1, the cover of the telephone is in the closed or on-hook position.

FIG. 3 is a plan view of the housing of the cellular telephone shown in FIG. 1 without the cover.

FIG. 4 is a side elevation view of the cellular telephone shown in FIG. 1 with the cover shown in phantom.

DETAILED DESCRIPTION OF DRAWINGS

Figure 1:
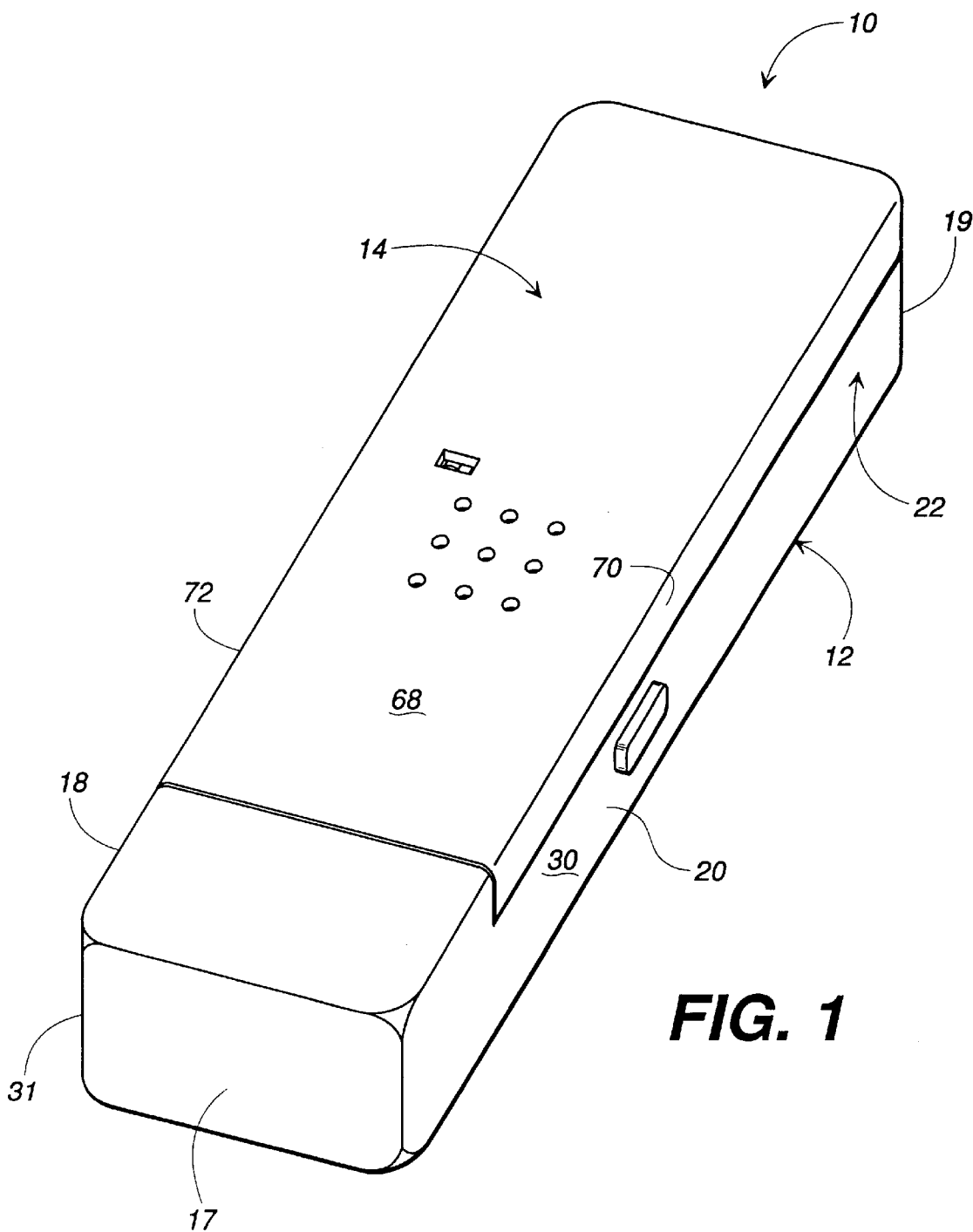
FIG. 1 is a perspective view of a portable cellular telephone made according to an embodiment of the present invention.

As summarized above, the present invention encompasses a portable radiotelephone including a selectively reciprocable user interface cover and an automatically extending antenna. A portable cellular telephone 10 made according to an embodiment of the present invention is shown in FIG. 1. Generally described, the cellular telephone 10 comprises a housing 12 for containing the electronic components of the telephone, a slidable cover 14 slidably engaged with the housing, and a user interface console 16 which is covered by the cover. The user interface console 16 is best shown in FIG. 2.

Figure 2:
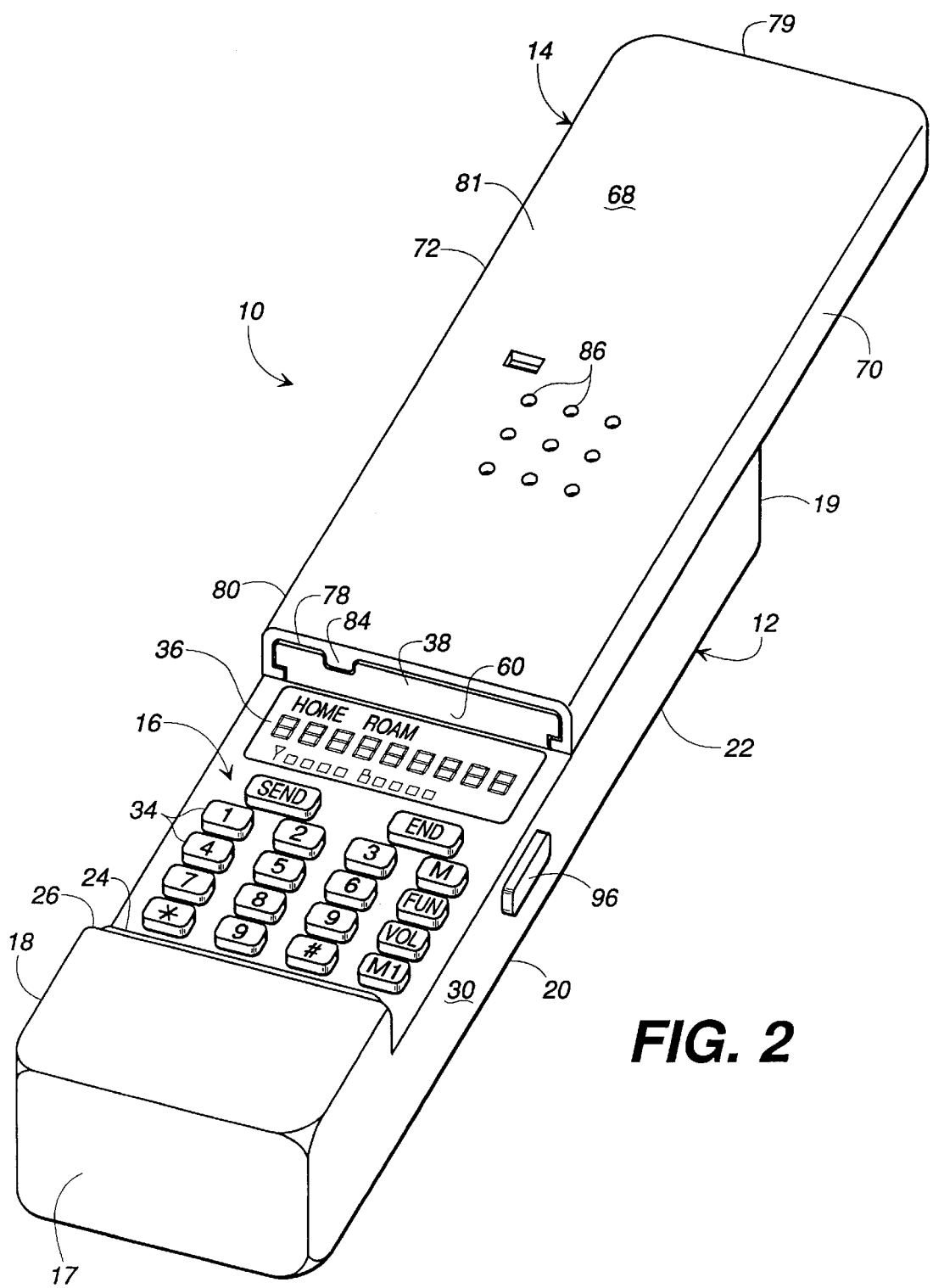
FIG. 2 is a perspective view of the cellular telephone shown in FIG. 1 with the cover in the open or off-hook position.
Figure 5:
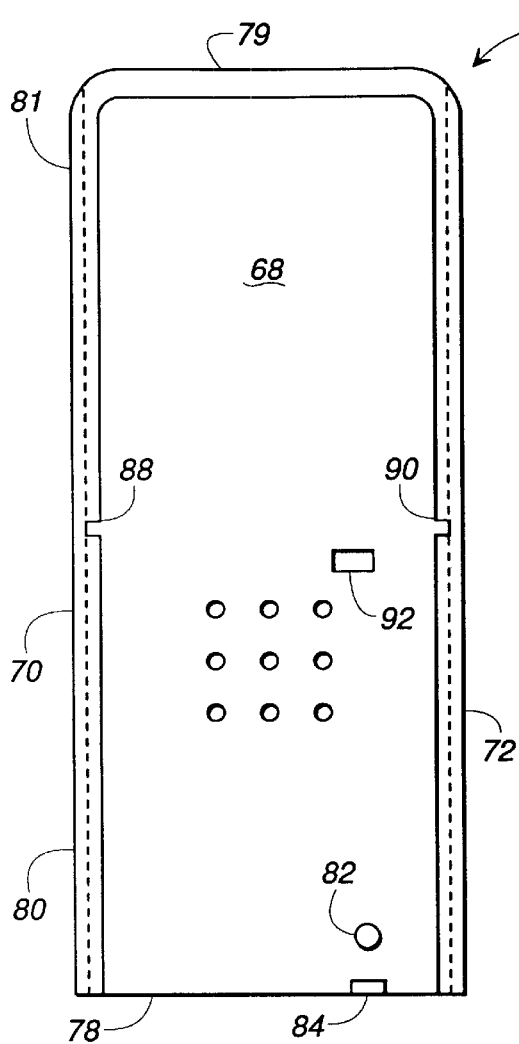
FIG. 5 is a plan view of the cover of the telephone shown in FIG. 1 illustrating the interior of the cover.

The cover 14 is selectively reciprocable relative to the housing 12 between a first position, illustrated in FIG. 1, wherein the cellular telephone 10 is in an on-hook condition, and alternatively, a second position, illustrated in FIG. 2, wherein the cellular telephone is in an off-hook condition. In the on-hook condition, the cover 14 covers the operator interface console 16, calls are not answered or made, and the operator interface console is nonfunctional. In the off-hook condition, the cover 14 is extended, the operator interface console 16 is exposed, and calls may be answered or made. In the off-hook condition, the operator interface console 16 is functional. As will be explained in more detail below, incoming calls are automatically answered when the cover 14 is shifted from the first position, wherein the telephone is in an on-hook condition, to the second position, wherein the telephone is in the off-hook condition. Likewise, calls can be automatically terminated by shifting the cover 14 from the second position, wherein the telephone is in the off-hook condition, to the first position, wherein the telephone is in the on-hook condition.

The housing 12 is desirably made of injection molded plastic and has a length extending along a longitudinal axis from bottom end 17 to a top end 19. The housing 12 includes a mouthpiece portion 18, a recessed central portion 20 containing the operator interface console 16, and an earpiece portion 22. The central portion 20 of the housing 12 containing the operator interface console 16 is disposed between the mouthpiece portion 18 and the earpiece portion 22.

The mouthpiece portion 18 of the housing 12 extends from the bottom end 17 toward the central portion 20 of the housing to an inset wall 24 for receiving the cover 14 when the cover is in the first position. The inset wall 24 forms a shoulder 26 against which the cover 14 rests in the first position. The inset wall 24 of the mouthpiece portion 18 is T-shaped and has recesses 28 and 29 adjacent respective sides 30 and 31 of the housing 12. One of the recesses 28 in the mouthpiece portion 18 includes a lower antenna contact 32. As will be explained in more detail below, the sliding cover 14 mates with the recesses 28 and 29 and the inset wall 24 of the mouthpiece portion 18 of the cover.

The central portion 20 of the housing 12 includes the operator interface console 16 as explained above.

The operator interface console 16 comprises a keyboard including a plurality of keys 34 typically found on a cellular phone and a display 36 for indicating the telephone number being called or dialed and roam or home status. Such a display is typical for cellular telephones and its structure and operation are well known to those skilled in the art.

As best shown in FIGS. 3 and 4, the earpiece portion 22 of the housing includes a raised cover guide 38 having a T-shaped cross-section like the inset wall 24 of the mouthpiece portion 18. The cover guide 38 is inset from the sides 30 and 31 of the housing 12 to form shoulders 44 and 46 along each side of the housing. The cover guide 38 also forms channels 48 and 50 extending adjacent the shoulders 44 and 46. As will be explained in more detail, the cover 14 slides matingly within the channels 48 and 50 of the cover guide 38.

The cover guide 38 of the earpiece portion 22 of the housing 12 includes holes 52 for releasing sound from the earpiece speaker (not shown) within the housing. In addition, the cover guide 38 includes a spring channel 54 extending along the length of the telephone 10. A tension spring 56 is disposed in the spring channel 54 and is fixed at one end to a peg 58 protruding from the cover guide 38 within the spring channel. The spring 56 extends from the peg 58 positioned proximate the top end 19 of the housing toward the central portion 20 of the housing. The cover guide 38 extends from the top end 19 of the housing 12 toward the central portion 20 of the housing to an end wall 60 adjacent the operator interface console 16. The end wall 60 of the cover guide 38 includes an opening 62 at the end of the spring channel 54 through which the tension spring 56 can extend.

The cover guide 38 has an upper antenna contact 64 disposed in one of the channels 48 adjacent the end wall 60. In addition, the cover guide 38 includes a pair of latch access holes 66 extending through the cover guide 38 at respective channels 48 and 50 proximate the end wall 60. The function of the upper antenna contact 64 and the latch access holes 66 are explained in more detail below.

Figure 6:
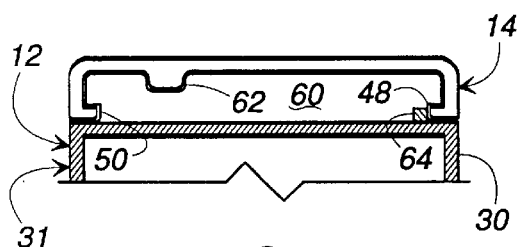
FIG. 6 is a partial sectional view of the telephone shown in FIG. 1 illustrating the cover and the housing.

The slidable cover 14, best shown in FIGS. 2, 4, and 6, comprises a central panel 68 extending between opposing L-shaped side walls 70 and 72. The L-shaped side walls 70 and 72 mate with the channels 48 and 50 of the cover guide 38 and the central panel 68 extends over the cover guide. The cover 14 extends from a lower end 78, which faces the mouthpiece portion 18 of the housing 12, to an upper end 79 proximate the top end 19 of the housing. The L-shaped side walls 70 and 72 extend between the lower and upper ends 78 and 79 of the cover 14. The cover 14 reciprocates over the cover guide 38 along the length of the telephone 10.

The cover 14 includes an antenna 74 embedded in the central panel 68 of the cover. The antenna 74 extends from an antenna connection wire 76, also embedded in the cover, to a distal end 77. The antenna connection 76 is embedded in the cover 14 proximate the lower end 78 of the cover and extends from one of the L-shaped side walls 70 to the antenna 74. The antenna 74 extends from the antenna connection 76 along the length of the cover 14 to the distal ends 77 of the antenna. The cover 14 is desirably made of injection molded plastic and the antenna is desirably made of a metal foil strip, preferably a copper foil strip. The antenna 76 desirably has a width of about ⅛ of an inch and a length equivalent of a quarter or half wavelength. The antenna connection 76 desirably is made of gold, platinum, or silver and makes contact with the lower antenna contact 32 and the upper antenna contact 64 when the cover 14 is in the first and second positions, respectively.

The cover 14 has a first portion 80 which extends from the lower end 78 of the cover toward the upper end of the cover 79 and covers the operator interface console 16 when the cover is in the first position. The cover 14 also has a second portion 81 which extends from the first portion 80 to the upper end 79 of the cover. The second portion 81 of the cover 14 covers the cover guide 38 when the cover is in the first position and extends beyond the housing 12 when the cover is in the second position.

The cover 14 also includes a peg 82 protruding from the interior of the panel 68 proximate the lower end 78 of the cover for holding the lower end of the spring 56. As will be explained below, the spring 56 thus biases the cover toward the second position. The central panel 68 of the cover 14 includes a plurality of holes 86 for releasing sound from the speaker within the housing 12. Desirably, the holes 86 in the cover are aligned with the holes 52 in the cover guide 38 when the cover is in the second position. Each of the L-shaped side walls 70 and 72 of the cover 14 has a latch catch 88 and 90 approximately midway between the lower end 78 and upper end 79 of the cover. The function of the latch catches 88 and 90 will be explained in more detail below. The cover 14 also includes a magnet 92 fixed to the interior of the central panel 68 approximately midway between the lower end 78 and upper end 79 of the cover. A magnetically activated switch 94, such as a reed switch or a hall effect switch, is disposed in the housing 12 proximate the top end 19 of the housing and is positioned so that the magnet in the cover 92 and the switch in the housing mate when the cover is in the second position and unmate when the cover is shifted back toward the first position. The mating and unmating of the magnet 92 and the switch 94 activate the switch as will be explained in more detail below.

Figure 7:
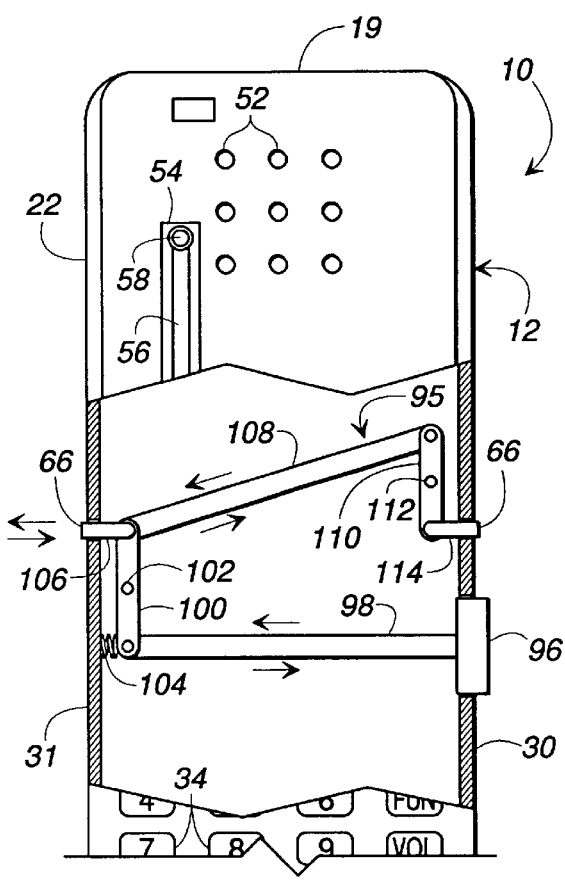
FIG. 7 is a partial plan view of the cover latch mechanism of the telephone shown in FIG. 1.

A cover release mechanism 95 is best shown in FIG. 7 and includes a release button 96 accessible through one side 30 of the housing 12. The release button 96 is connected to an actuator arm 98 which extends from the one side 30 of the housing to an opposite side 31 of the housing to one end of a first rocker arm 100. The actuator arm 98 is pivotally connected to the first rocker arm 100 and the first rocker arm is mounted to the housing 12 at a fixed pivot 102. A compression spring 104 fits between the opposite end 31 of the housing 12 and the actuator arm 98 to bias the actuator arm toward the release button 96. The first rocker arm 100 is pivotally connected to a first latch pin 106 which reciprocates through the latch access hole 66 in the opposite side 31 of the housing 12 at an end of the first rocker arm opposite the end of the first rocker arm connected to the actuator arm 98. At the same end to which the first rocker arm 100 is connected to the first latch pin 106, the first rocker arm is pivotally connected to one end of the floating actuator arm 108. The floating actuator arm 108 extends from the first rocker arm 100 to one end of a second rocker arm 110 mounted to a fixed pivot 112 proximate the one side 30 of the housing 12. The second rocker arm 110 is pivotally connected at an end opposite the connection to the floating actuator arm 108 to a second latch pin 114. The second latch pin 114 reciprocates through the latch access hole 66 in the channel 48 of the cover guide 38 adjacent the one side 30 of the housing 12. When the release button 96 is uncompressed, the latch pins 106 and 114 are biased by the compression spring 104 outwardly through the latch access holes 66. When the release button is compressed, the rocker arms 100 and 110, in cooperation with the floating actuator arm 108, draw the latch pins 106 and 114 out of the latch access holes 66 and toward the interior of the housing 12.

Figure 8:
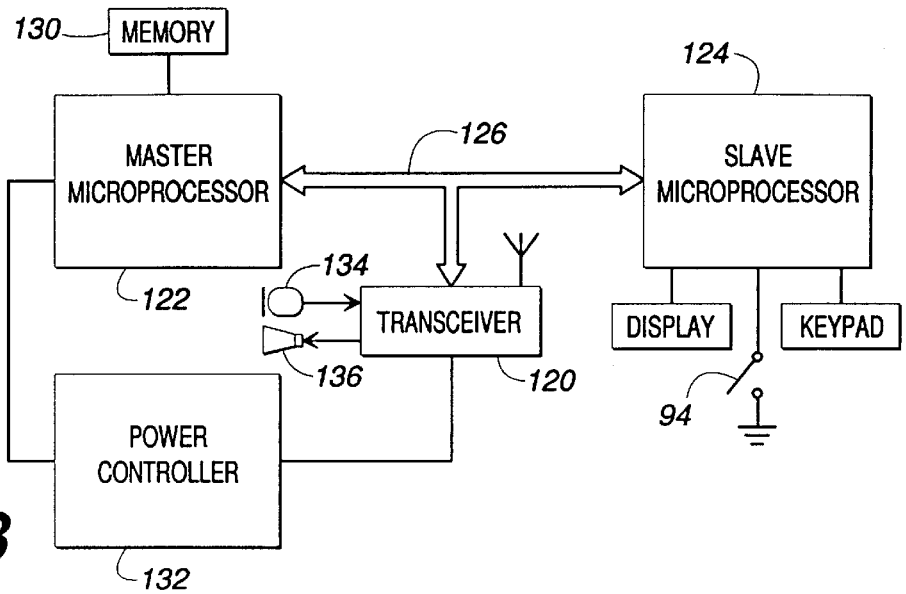
FIG. 8 is a block diagram of the electronic package of the telephone shown in FIG. 1.

The electronic components of the cellular telephone 10 are conventional and are disposed in the housing 12. A suitable electronics package is illustrated in FIG. 8 and generally comprises a transceiver 120, a master microprocessor 122, and a slave microprocessor 124, all connected by a data bus 126.

The magnetically operated switch 94 activated by the mating or unmating of the magnet 92 and the switch in the cover 14 and the housing 12, respectively, sends signals to the slave microprocessor 124 indicating a change in state of the cover position from the first position to the second position and vice versa. The slave master microprocessor 124 sends an interrupt signal to the master microprocessor 122 in response to receiving signals from the switch 94. The slave microprocessor 124 enables the telephone user to communicate with the master microprocessor 122 and transceiver 120. The slave microprocessor 124 is coupled to the display 36 and the keypad. The display 36 through the slave microprocessor 124, indicates telephone number being dialed home or roam status. The keypad enables the user to input telephone numbers, store and recall telephone number information, and perform other cellular telephone functions such as terminate a phone call.

The master microprocessor 122 controls the basic functions of the cellular telephone 10 such as providing power-up or power-down in response to interrupt signals originated by the switch 94, answering a phone call, transmitting a phone call, and storing telephone numbers and the status of the cover position in memory 130. A power controller 132 controls the power to the electronics.

The transceiver 120 transmits and receives cellular telephone communications. The transceiver 120 is coupled to a microphone 134 disposed in the mouthpiece portion 118 of the housing 12. Communications from the user are received by the microphone 134 and then transmitted by the receiver over cellular telephone communication channels. The transceiver 120 is also coupled to a speaker 136 housed in the earpiece portion 122 of the housing 12. The transceiver 120 receives cellular telephone communications from cellular telephone channels and communicates the transmissions to the user via the speaker 136.

It should be understood that the components of the electronic package used in the cellular telephone 10 may vary. For example, it may be desirable to use a single microprocessor rather than the combination of the master microprocessor 122 and the slave microprocessor 124.

The design of the cellular telephone 10 allows the user to automatically answer an incoming phone call by shifting the cover 14 from the first position wherein the operator interface console 16 is covered to the second position wherein the operator interface console is exposed. In addition, the antenna 74 of the cellular telephone 10 is automatically extended when the cover 14 is shifted from the first position to the second position. A phone call can be automatically terminated by shifting the cover 14 from the second position to the first position wherein the operator interface console is covered.

Figure 9:
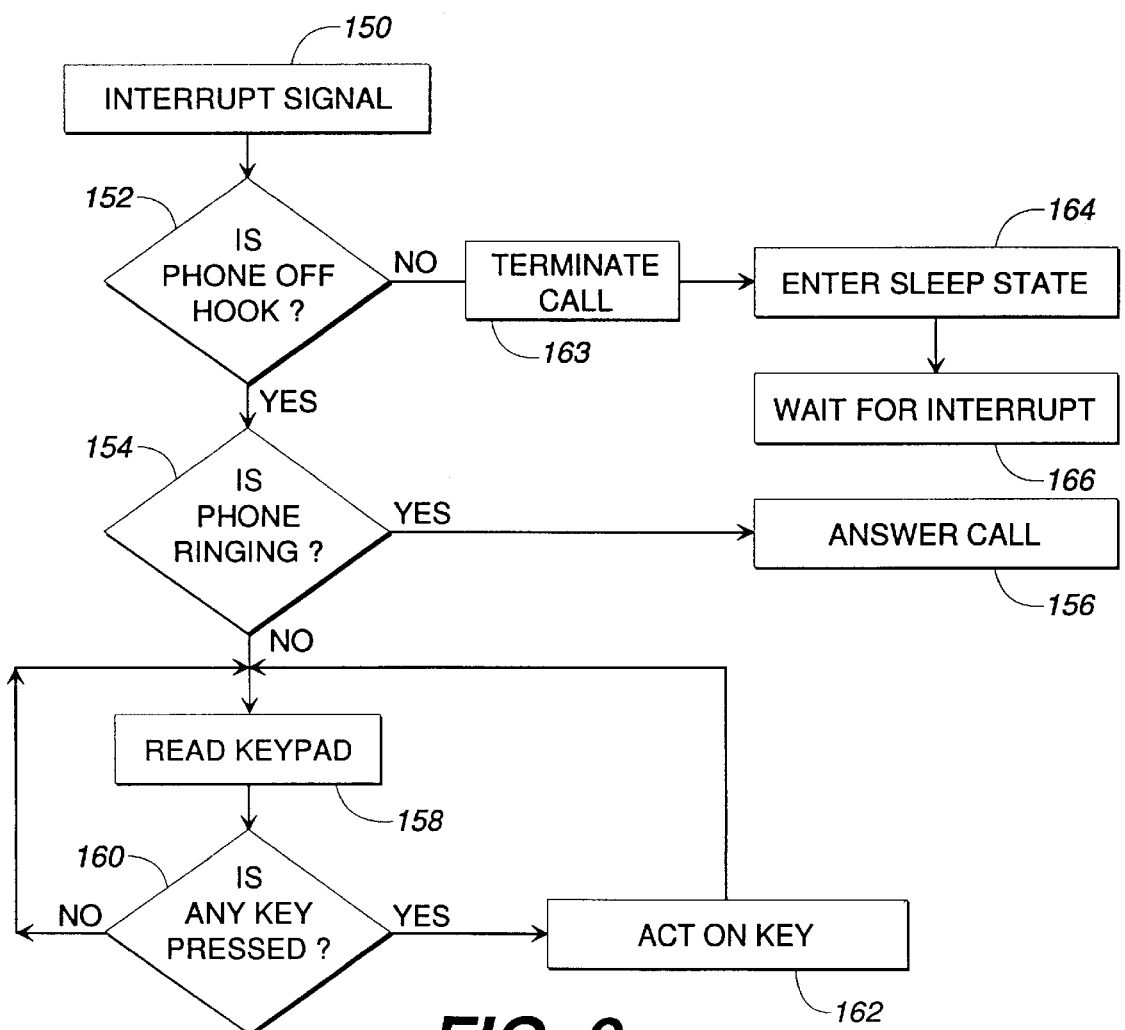
FIG. 9 is a block diagram of the function of the microprocessor used in the telephone shown in FIG. 1.

The flow chart on FIG. 9 illustrates the function of the cellular telephone 10 in response to shifting the cover 14 from the first position to the second position and vice versa. When the cover 14 is in the first position wherein the operator interface console 16 is covered, the telephone 10 is in low power mode which is also known as sleep state. In addition, while the cover 14 is in the first position, the latch pins 106 and 114 are biased outwardly and extend through the latch access holes 66 in the cover guide 38 of the housing 12 and into the latch catches 88 and 90 of the cover to hold the cover in the first position. In the first position, the cover 14 is biased by the tension spring 56 toward the second position. When the cover 14 is in the first position, the spring 56 is extended downwardly over the operator interface console 16 and toward the bottom end 17 of the housing by the peg 82 protruding from the cover.

When it is desired to answer an incoming call or make a phone call, the release button 96 is pressed to release the cover 14 and automatically shift the cover from the first position to the second position wherein the cover is partially extended beyond the housing 12. When the release button 96 is pressed, the first and second latch pins 106 and 114 are withdrawn from the latch catches 88 and 90 in the cover and the tension spring 56 returns to its unextended position in the spring channel 54 thereby pulling the cover from the first position to the second position. When the cover 14 reaches the second position, the magnet 92 and switch 94 in the cover 14 and housing 12, respectively, mate and cause the switch to send an interrupt signal to the slave microprocessor 124 at 150 of the block diagram in FIG. 9. The master microprocessor 122 recognizing that the phone is now off-hook at 152 inquires as to whether the phone is ringing at 154. If the phone is ringing, the call is automatically answered at 156. If the phone is not ringing, the master microprocessor 122 through the slave microprocessor 124 reads the keypad at 158. If any key is pressed at 160, the master microprocessor 122 acts on the key at 162 and then again reads the keypad at 158. If no key is pressed at 160, the master microprocessor 122, through the slave microprocessor 124, again reads the keypad at 158. This process continues until another interrupt signal is received at 150.

When the cover 14 is shifted from the second position to the first position to cover the operator interface console 16, the unmating of the magnet 92 and the switch 94 causes the switch to send another interrupt signal at 150. Recognizing that the phone is no longer off-hook and is now on-hook at 152, the telephone 10 terminates any call being handled by the phone at 163, enters the sleep state at 164, and then waits for another interrupt at 166.

When the cover 14 is in the first position, the antenna 74 is connected to the transceiver 120 through the antenna connector 76 which is connected to the lower antenna contact 32 at the mouthpiece portion 18 of the housing 12. This connection allows the telephone 10 to receive incoming telephone calls even though the antenna 74 is not extended. When the cover 14 is shifted to the second position, the antenna connector 76 connects the antenna 74 to the transceiver 120 via the upper antenna contact 64 in the cover guide 38 of the housing 12. The antenna 74 is disconnected from the transceiver 120 for a short period of time while the cover 14 shifts from the first position to the second position, but not enough time for the phone call to be disconnected.

It should be understood that although the cellular telephone 10 described and illustrated herein includes a tension spring 56 for automatically shifting the cover from the first position to the second position, other means may be used to cause the automatic shifting of the cover. Suitable alternative shifting means include a compression spring, a pneumatic cylinder, and electric servo motors.

It should be understood that the foregoing relates to particular embodiments of the present invention, and that numerous changes may be made therein without departing from the scope of the invention as defined by the following claims.

We claim:

1. A portable radiotelephone comprising:

a housing;

a microphone, a speaker, and a transceiver disposed in the housing for transmitting and receiving radio telephone communications;

a cover slidably engaged with the housing and selectively reciprocable relative to the housing between a first position, wherein the portable radiotelephone is in an on-hook condition and, alternatively, a second position, wherein the portable radiotelephone is in an off-hook condition and at least a portion of the cover extends outwardly beyond the housing;

a switch connected to the housing and coupled to a microprocessor, the switch capable of switching the portable radiotelephone from the on-hook condition to the off-hook condition in response to the cover being shifted from the first position to the second position, and the switch capable of switching the portable radiotelephone from the off-hook condition to the on-hook condition in response to sliding the cover from the second position to the first position;

an operator interface console mounted to the housing relative to the housing such that the cover covers the operator interface console in the first position and the operator interface console is uncovered when the cover is in the second position;

an antenna fixed to and extending along the cover such that at least a portion of the antenna extends outwardly beyond the housing when the cover is in the second position;

means for selectively holding the cover at the first position and, alternatively, releasing the cover; and means for automatically moving the cover from the first position to the second position in response to the releasing means releasing the cover.

2. A portable radiotelephone as in claim 1 wherein the switch is a magnetically operated switch mounted in the housing and the portable radiotelephone further comprises a magnet mounted in the cover such that the switch and the magnet mate with one another when the cover is in the second position and the magnet manipulates the switch.

3. A portable radiotelephone as in claim 1 wherein the means for automatically moving the cover comprises a spring positioned to bias the cover toward the second position.

4. A portable radiotelephone as in claim 3 wherein the spring is a tension spring having a first and a second end, the first end of the tension spring being attached to the housing and the second end of the spring being attached to the cover.

5. A portable radiotelephone as in claim 1 wherein the cover includes a latch catch and the means for holding and releasing the cover comprises a latch and an actuator means for selectively engaging the latch with the latch catch and, alternatively, disengaging the latch from the latch catch.

6. A portable radiotelephone as in claim 1 wherein:

the cover has a central panel, a length, and a pair of opposing sides extending along the length of the central panel and spaced from one another, each of the opposing sides having a latch catch; and the means for holding and releasing the cover includes a first latch pin selectively engageable with one of the latch catches and, alternatively, disengageable with the one latch catch, and a second latch pin selectively engageable with the other of the latch catches and, alternatively, disengageable with the other latch catch.

7. A portable radiotelephone as in claim 1 further comprising;

a first antenna contact mounted to the housing; and a second antenna contact mounted to the housing and spaced from the first antenna contact such that the antenna contacts the first antenna contact when the cover is in the first position and contacts the second antenna contact when the cover is in the second position.

8. A portable radiotelephone as in claim 1 wherein the cover is plastic and the antenna is embedded in the plastic cover.

* * * * *